Patented Apr. 9, 1946

2,397,956

UNITED STATES PATENT OFFICE 2,397,956

PRODUCTION OF LUBRICANTS

Harold M. Fraser, New Orleans, La., assignor to International Lubricant Corporation, New Orleans, La., a corporation of Louisiana No Drawing. Application January 15, 1943, Serial No. 472,509

15 Claims. (Cl. 252—40)

The present invention relates to the production of lubricants, and more particularly to lubricants containing a lubricant base, as for example mineral oil or other equivalent oils well known in the art, said lithium soap in the preferred form of the invention being a lithium soap of 12-hydroxy stearic acid, or a lithium soap of hydrogenated castor oil.

It has hitherto been proposed to manufacture lubricants containing lithium soaps of the fatty acids, as for example lithium stearate or lithium oleate. However, during the manufacture of such greases, difficulties have been experienced in obtaining sucessive batches of grease having the same uniform characteristics. For example, in the manufacture of a grease containing lithium stearate, one batch of the grease may produce a relatively hard grease, and the succeeding batch may produce a much softer grease. Difficulties of this character are eliminated when the grease is made with a lithium soap of a hydroxy stearic acid, and preferably a lithium soap of 12-hydroxy stearic acid, or a lithium soap of hydrogenated castor oil. In general, it may be stated when greases are manufactured with lithium soaps of the character above pointed out, the resulting greases have more uniform characteristics.

It also has been discovered that a grease containing a lithium soap of hydroxy stearic acid, and particularly the lithium soap of 12-hydroxy stearic acid, or the lithium soap of hydrogenated castor oil, possesses exceedingly high mechanical stability. After mechanical working, greases containing lithium soaps of the above character have a substantially greater consistency than greases worked to a similar extent which contain lithium stearate, oleate, or other lithium fatty acids. In other words, greases containing the lithium soap of hydroxy stearic acid, and especially the lithium soap of 12-hydroxy stearic acid, or the lithium soap of hydrogenated castor oil, retain their consistency over a long periods of mechanical working, whereas similar greases containing the lithium soap of stearic acid or oleic acid and similar fatty acids deteriorate in mechanical consistency. One field in which the greases of the present invention have given excellent results is in the lubrication of ball bearings where a lubrication is needed which will not drip from the bearing due to change in consistency from mechanical working.

It has also been discovered that if a lithium soap of hydroxy stearic acid, and especially 12-hydroxy stearic acid, and a lithium soap of hydrogenated castor oil is formed in situ in a grease by heating a lubricant base, as for example mineral oil, vegetable oil, or animal oil or mixture thereof, or similar oils well known to the art, and the heating of the mixture is carried to a point above the melting point of the grease, as for example to 425° F., a firmer and more stable grease is produced if the grease is stirred during the time it is cooling from a fluid to a solid or semi-solid state. A grease prepared in the manner above set forth which is agitated during the time it is cooling exhibits less tendency to seep oil. Therefore, in the preferred form of the present invention, the fluid grease is agitated during the period the grease is cooling from a liquid to a solid or semi-solid state. More specifically, a firmer grease is obtained if the grease is agitated while it is cooled from a fluid state, that is from above the melting point of the grease to about 275° or in the neighborhood of 200° F. It is desired to point out that it is exceedingly difficult to obtain a uniform grease of good texture when a lithium stearate grease is stirred while cooling. When a lithium stearate grease solidifies, it assumes a very stiff state, and if any attempt is made to stir it, the grease becomes ropy and separates into lumps of grease of very poor quality.

In the preferred form of the invention, the greases containing the lithium soap of hydroxy stearic acid, and preferably the lithium soap of 12-hydroxy stearic acid, are during the process of manufacture heated to a point to substantially dehydrate the grease, that is, so the grease will contain less than 0.025% to 0.5%, and preferably less than 0.025% of water. If the greases prepared as herein set forth are heated above 400° F., and usually between 400 to 425° F., practically all of the water present is driven off and the grease then is substantially dehydrated. If the grease is heated to temperatures below 400° F., varying amounts of water are left in the grease.

It has also been ascertained that greases containing the lithium soaps of hydroxy stearic acid, and particularly 12-hydroxy stearic acid, and greases containing the lithium soap of hydrogenated castor oil as originally produced, have a rather grainy or coffee grounds appearance, but that this grease can be converted to a smooth buttery texture by milling the grease by any suitable milling method, but preferably in accordance with the method set forth in my U. S. Patent 2,257,945.

It has also been discovered that greases containing a lithium soap made by reacting a lithium compound with a fatty acid of hydrogenated castor oil exhibit a much better inhibition against oxidation with phenylenediamine and especially metaphenylenediamine than when the grease is made with a lithium soap produced by reacting a lithium compound with hydrogenated castor oil or hydrogenated glyceryl ricinoleate or ricinoleates, or glyceryl 12-hydroxy stearate or stearates. When the lithium compound is reacted with the latter compounds, a small amount of glycerine is produced and the difference in the action of the anti-oxidant is probably due to the presence of the glycerine.

The present invention in one form is directed to the production of a grease containing a plurality of soaps, one of the soaps being a lithium soap of hydroxy stearic acid, and especially a lithium soap of 12-hydroxy stearic acid or a lithium soap of hydrogenated castor oil. More particularly, the grease may contain in addition to the lithium soap herein set forth a sodium soap of a higher fatty acid such as sodium stearate or oleate, or a calcium soap of a higher fatty acid, or lithium soap of a higher fatty acid.

In producing greases in accordance with the present invention, any substantially completely hydrogenated castor oil or hydrogenated castor oil fatty acids may be used, the latter being produced by splitting hydrogenated castor oil. Excellent results have been obtained by using hydrogenated castor oil and hydrogenated castor oil fatty acids having the properties set forth in the following table:

TABLE I

|  | Hydrogenated castor oil | Hydrogenated castor oil fatty acids |
|---|---|---|
| Percent free fatty acids | 1.4 | 88 |
| Saponification value | 181 | 186 |
| Iodine value | 2.7 | 4.6 |
| Titre | 74.2 | 69 |

In producing the lithium soap from the hydrogenated castor oil or the fatty acid of hydrogenated castor oil above set forth, any suitable lithium compound may be used, including lithium hydroxide, lithium carbonate, lithium oxide and the like. Preferably due to the ease of manufacture, the lithium compound used is lithium monohydrate which contains from 53 to 55% of lithium hydroxide. Lithium hydroxide (containing 99% Li OH) has also given satisfactory results, but is more expensive than the lithium monohydrate.

A grease containing lithium soap of hydrogenated castor oil may be made as follows: 370 grams of hydrogenated castor oil of the character above set forth are mixed with 370 grams of paraffin neutral oil and heated to approximately 175° F. in a small kettle. Thereafter, 60 grams of lithium hydroxide (53 to 55% Li OH) is dissolved in approximately 700 grams of water and added to the mixture in the kettle. Reaction is immediately started and heating is continued until the grease is nearly dry. Then 790 grams of 200 paraffin oil, 350 grams of 2000 Coastal oil, and 720 grams of 120 bright stock are added slowly within a period of one hour while the reaction mass is heated, from about 250 to 375° F. The temperature of the reaction mass is then raised to about 425° F., at which temperature the mass is fluid. Heating is then stopped and the grease preferably agitated as by stirring during the period it is solidifying. It is not imperative that the grease be agitated or stirred while cooling, but it is highly desirable, as it produces a firmer, more uniform grease having a less tendency to seep oil than if agitation had been omitted. The grease is allowed to cool to about 275° and then dumped into a metal pan where it is allowed to cool to room temperature. If the grease is stirred in the kettle to a sufficiently low temperature, it can be filled directly into shipping containers. However, it is preferred to dump the grease into the cooling pans and thereafter when the grease is cold mill and filter the grease in accordance with the method set forth in U. S. Patent 2,257,945. The pans are usually filled to a depth of about three inches. When the batch, compounded as above set forth, is poured into a pan in three inch layers, the grease cools to room temperature in about six to ten hours. It is highly desirable to control the cooling rate of the grease down to 275° F. However, after the grease has been stirred or agitated at a temperature from above 275° to about 275° F., the cooling rate does not become of great importance. However, if the stirring of the grease is continued from about 250° F. to about 225° F., a much firmer grease is produced.

The following table shows the effect of agitation while cooling on the worked penetration of the grease:

TABLE II

| Batch No. | (1) | (2) | (3) | (4) | (5) |
|---|---|---|---|---|---|
| Temperature | 420° F. | 300° F. | 250° F. | 200° F. | 150° F. |
| A. S. T. M. worked penetration | 210 | 187 | 181 | 181 | 185 |

The results set forth in Table II were obtained in the following manner. A large sample of the grease compounded as herein set forth was melted at 425° F. A portion of this large sample was poured at 420° while liquid. This grease, identified as batch No. 1 in Table II, had not been stirred and had a worked penetration of 210. Another batch of the grease which had been compounded at 425° F. was stirred down to 300° F. This grease, identified as batch No. 2, solidified at 385° F. and was dumped at 300° F. for further cooling without any further stirring. Batch No. 2 had a worked penetration of 187. Batch No. 3 of the grease compounded as herein set forth was stirred down to 250° F. and dumped for further cooling without any further stirring. Batch No. 3 had a worked penetration of 181. Batch No. 4 of the grease which was prepared as herein set forth and heated to 425° F. was stirred to 200° F. and dumped for cooling. Batch No. 4 had a worked penetration of 181. A fifth sample of the grease compounded as herein set forth, which had been heated to 425° F., was stirred while cooling to 150° F. and then dumped. Batch No. 5 had a worked penetration of 185. All of the above batches were cooled to room temperature, that is around 70° F., and the A. S. T. M. worked penetration determined.

It is clear from a consideration of the data set forth in Table II that the grease that is poured at 420° F. without any stirring was considerably softer than the greases which had been stirred while each batch thereof was cooling from 425° F. It further appears that at or about 250° F. a critical change takes place, as stirring beyond 200 to 225° F. produces an increase in the worked penetration of the grease, although the worked penetration of the grease which has been stirred and cooled to 150° F. is notably lower than one which has been cooled from 420° F. without agitation.

The consistency of the greases produced in accordance with the present invention and containing a lithium soap of a hydroxy fatty acid, and particularly a lithium soap of hydroxy stearic acid, especially 12-hydroxy stearic acid, or a lithium soap of hydrogenated castor oil, may be tested in accordance with the "Roll test" which is now in use by several large grease producing companies. The apparatus in which the test is made consists of a horizontal 3½" hollow cylinder, 7" long, into which there is placed a solid steel cylinder 2¼" in diameter and 7" long, weighing approximately 11 pounds. The cylinder, initially closed at one end, has a cap placed thereover after the grease has been introduced into the cylinder. Enough clearance is permitted for the solid steel cylinder to roll free inside the other cylinder which is rotated at 160 R. P. M. The solid cylinder rotates by means of contact with the side of the hollow cylinder. In an apparatus of this character, a great amount of grease may be rolled for a given period of time and tested for consistency to obtain the degree of mechanical stability of the grease. The smaller cylinder rolls, works and masticates the grease thoroughly.

At given time intervals the grease is removed, tested for consistency, and then replaced in the apparatus for further working. The consistency of the grease is determined by means of a special small cone attached to the regular A. S. T. M. penetrometer. A small cup is used in conjunction with the test. The worked penetration obtained by this apparatus is herein termed "Micro penetration," which may be correlated, if desired, with the regular A. S. T. M. penetration by means of a previously determined curve.

"Micro penetration" tests were made on a grease produced in accordance with the present invention and containing 18.5% of the lithium soap of hydrogenated castor oil, and similar tests were made on a grease containing a similar amount of lithium stearate soap and a similar amount of lithium oleate soap. In all of the tests the soap base was incorporated in a 500 viscosity oil.

The following table shows the results of the results of the "Roll test" made in the apparatus above set forth:

TABLE III

Micro penetration

| Grease containing | Lithium soap of hydrogenated castor oil | Lithium soap of stearic acid | Lithium soap of oleic acid |
|---|---|---|---|
| A. S. T. M. worked Penetration | | | |
| Before rolling | 174 | 175 | 228 |
| 2-hour roll | 43 | 46 | 88 |
| 4-hour roll | 50 | 70 | 184 |
| 8-hour roll | 55 | 90 | 200 |
| 16-hour roll | 64 | 99 | Too soft |
| 26-hour roll | 69 | 115 | |
| 32-hour roll | 70 | 123 | |
| 40-hour roll | 70 | 123 | |

Referring to Table III, the results there set forth clearly indicate that a grease made with a lithium soap of hydrogenated castor oil does not break down or lose its consistency to the extent that a similar grease breaks down when said grease contains lithium stearate or lithium oleate. This ability to maintain consistency is a very desirable attribute of a lubricating grease.

Similar results are obtained when the grease contains a lithium soap of 12-hydroxy stearic acid produced from hydrogenated castor oil or from hydrogenated castor oil fatty acids, or from any other initial starting material, it being recognized that the 12-hydroxy stearic acid may be produced from other starting materials.

In producing a grease containing a plurality of soaps, one of which is a lithium soap, of an unsaturated hydroxy fatty acid, or a hydroxy stearic acid, or a 12-hydroxy stearic acid, or a lithium soap of hydrogenated castor oil, or a lithium soap of the fatty acids of hydrogenated castor oil, or a mixture of any of the above, there may also be incorporated in the grease during the manufacture thereof a non-lithium soap which may be a metal soap or a metalloid soap, or a soap made by the saponifying of a soap-forming ingredient with an organic compound, as, for example, ethanolamines, and the like. However, it is preferred to make a grease containing the lithium soap and then make a grease containing the non-lithium soap, and then to mix the greases when cold, as this tends to produce a more uniform grease. The following are examples of greases containing a plurality of soaps, one of said soaps being a lithium soap of hydrogenated castor oil:

EXAMPLE 1

80% lithium hydrogenated castor oil soap grease
20% sodium soap grease
Melting point 347° F.
A. S. T. M. worked penetration 253
4-hour roll test 99
The total soap content of the grease was 14.1%

EXAMPLE 2

90% lithium hydrogenated castor oil soap grease
10% calcium soap grease
Melting point 308° F.
A. S. T. M. worked penetration 283
4-hour roll test 91
The total soap content was 15%

EXAMPLE 3

80% lithium hydrogenated castor oil soap grease
20% calcium soap grease
Melting point 265° F.
A. S. T. M. worked penetration 278
4-hour roll test 100
The total soap content was 14.8%

EXAMPLE 4

60% lithium hydrogenated castor oil soap grease
40% calcium soap grease
Melting point 238° F.
A. S. T. M. worked penetration 308
4-hour roll test 103
The total soap content was 14.5%

EXAMPLE 5

90% lithium hydrogenated castor oil soap grease
10% aluminum soap grease
Melting point 380° F.
A. S. T. M. worked penetration 300
4-hour roll test 99
The total soap content was 14.2%

EXAMPLE 6

80% lithium hydrogenated castor oil soap grease
20% aluminum soap grease
Melting point 260° F.
A. S. T. M. worked penetration 29-
4-hour roll test 107
The total soap content was 13.3%

Example 7

60% lithium hydrogenated castor oil soap grease
40% aluminum soap grease
Melting point 246° F.
A. S. T. M. worked penetration 345
4-hour roll test 148
The total soap content was 11.5%

In the soaps above set forth the melting points vary from 238° to 380° F.; the A. S. T. M. worked penetration varies from 253 to 345. The roll test for a period of four hours varies from 41 to 148. Usually a grease which passes the 4-hour roll test and exhibits a micro penetration of around 75 to 175 is satisfactory, although at 175 the grease is a very soft grease.

The following are additional examples showing the production of greases containing lithium soap of hydrogenated castor oil.

Example I

Melt together 1000 grams of hydrogenated castor oil and 1000 grams of 200 paraffin neutral oil. Separately dissolve 162 grams of lithium hydroxide (53 to 55% LiOH) with 900 grams of water. The lithium hydroxide is then added to the mixture of hydrogenated castor oil and paraffin neutral oil and saponification allowed to proceed. The excess water is then evaporated and thereafter there is added 2000 grams of 200 paraffin neutral oil, 1500 grams 2000 coastal red oil, and 1750 grams 120 vis. 210° F. Bright Stock. The mixture is heated to 425° F. and stirred while the reaction mixture cools to 275° F. Preferably an oxidation inhibitor such as meta phenylenediamine is added, usually at about 150° F. At or about 275° F. the grease is dumped into a pan and allowed to cool to room temperature. The resulting grease contains 14% of the lithium soap of hydrogenated castor oil and has the following properties:

14% soap
A. S. T. M. worked penetration 282
Ubbelohde melting point 384
Per cent free LiOH .017

The glycerine generated or liberated by the saponification reaction remains in the oil and probably accounts for the difference in behavior of the anti-oxidants, such as the phenylenediamines, and particularly the meta phenylenediamines, as compared with the action of such antioxidants when the fatty acids of hydrogenated castor oil are used in place of the glycerides.

Example II 370 grams of hydrogenated castor oil is melted with 370 grams of 100 S. U. vis. @ 100° F. coastal oil. The melt is then saponified with a lithium hydroxide solution made by adding 60 grams lithium hydroxide to 360 grams water. When saponification is complete and the water has been evaporated there is then added 2260 grams of 57 S. U. vis. @ 100° F. coastal oil. The reaction mass is heated from 400 to 425° C., the grease being liquid within this range. Preferably the grease is stirred or agitated while the grease is cooling from said temperature range to about 275°. The grease is then poured into pans and allowed to cool in 3" layers to room temperature, the period of cooling being approximately eight hours. The grease produced in this example had a soap content of 12.3%, an A. S. T. M. worked penetration of 215, and a Ubbelohde melting point of 340° F.

Example III 370 grams of hydrogenated castor oil was melted with 370 grams of 100 paraffin oil. The melt was saponified with lithium hydroxide produced by dissolving 60 grams of lithium hydrate and 400 grams of water. Saponification was allowed to proceed to substantial completion and the water was evaporated. Thereafter there was added 580 grams of 100 paraffin oil and 1520 grams of 2000 coastal red oil. The reaction mass was stirred while cooling down to 250° F. and the cooled grease was dumped into a pan in 3" layers for further cooling to room temperature. The grease produced in accordance with Example III contained 13½% soap and had a worked penetration of 333.

Example IV 650 grams of hydrogenated castor oil fatty acids were melted with 350 grams of hydrogenated castor oil and 1000 grams of paraffin neutral oil. To the melt there was added a batch of lithium hydroxide produced by dissolving 163 grams of lithium hydrate in 900 grams of water. Saponification was allowed to proceed to substantial completion and the water was evaporated. There was then added 1850 grams of 200 paraffin neutral oil, 1700 grams of 2000 coastal red oil, 1600 grams of 120 Bright stock, 12 grams of meta phenylenediamine. The reaction mass was heated from 400 to 425° F. and stirred while the reaction mass was cooling down to a temperature of 225° F.

The grease produced in accordance with the above example contained 14½% of a lithium soap approximately one third of which was produced from hydrogenated castor oil and the other two thirds of which was produced from hydrogenated castor oil fatty acids. The grease had an A. S. T. M. worked penetration of 200 and a 2-hour roll test gave a consistency of 74. The 4-hour roll test gave a consistency of 75, and the 15-hour roll test gave a consistency of 85.

Example V 1200 grams of hydrogenated castor oil fatty acids and 1200 grams of 200 paraffin neutral oil were melted and to the melt there was added a batch produced by dissolving 197 grams of lithium hydrate with 1000 grams of water. Saponification was allowed to proceed to substantial completeness and the water was evaporated. There was then added to the resulting mass 1600 grams of 200 paraffin neutral oil, 1500 grams of 2000 coastal red oil, 1550 grams of 120 Bright stock, and 10 grams of meta phenylenediamine. The resulting grease contains 17% of the lithium soap of hydrogenated castor oil fatty acids, had a worked penetration of 233; and a Ubbelohde melting point of 388° F. The micro penetration on a 2-hour roll test was 96; on a 4-hour roll test 96; on a 15-hour roll test 105; on a 22-hour roll test 107; and on a 38-hour roll test 107.

While the lubricating bases used in the examples set forth are mineral oil bases, it is obvious that the mineral oil base may have mixed therewith any of the well known lubricating bases including hydrogenated fish oils, animal oils, vegetable oils and rosin or a plurality thereof.

As pointed out, the soap which is incorporated in the grease in accordance with the present invention may be in one form of the invention a lithium soap of hydrogenated ricinoleic acid or of hydrogenated castor oil, or may be the lithium soap formed by reacting a lithium component with hydrogenated castor oil fatty acids, or the lithium soap may be formed by reacting a lithium component with a mixture of hydrogenated castor oil and the fatty acids obtained by saponifying hydrogenated castor oil. The lithium soap may be a soap of 12-hydroxy stearic acid. This designation in accordance with the common use, means that the hydroxy group is on the twelfth carbon atom from the carboxyl group. In accordance with the present invention, the lubricating medium, as for example a grease, may have incorporated therein a lithium soap of a 10-hydroxy stearic acid.

In accordance with the present invention, there may also be incorporated in a lubricating medium, as for example a grease, the lithium soaps of the poly-hydroxy stearic acids. The poly-hydroxy stearic acids may be prepared by oxidation and subsequent hydroxylation of the oleic acid. The lithium soap of this acid may be prepared by direct reaction of this acid with a lithium compound.

It is desired to point out that the lithium soaps of hydroxy fatty acids and particularly the lithium soap of hydrogenated ricinoleic acid or of hydrogenated castor oil, or the lithium soap of 12-hydroxy stearic acid, irrespective of its source of origin, have an OH group present in the chain, and this is true of very few other fatty acids.

While in the preferred form of the invention greases are produced by incorporating therein lithium soaps of the character herein disclosed, it is desired to point out that fluid lubricating mediums which are not in grease form may also have incorporated the lithium soaps herein set forth.

While it is not desired to be limited to any particular lubricating base, or to a grease containing any particular percentage of the lithium soaps of the character herein disclosed, in general it may be stated that the lubricant base may have the lithium soap present in amounts up to 50% of the total weight of the grease. In the more limited aspect of the invention, the lithium soap of an unsaturated hydroxy fatty acid, or of a poly-hydroxy fatty acid, or of 12-hydroxy stearic acid, or of hydrogenated castor oil, or of fatty acids of hydrogenated castor oil, or a mixture of any or all of said soaps, may be present in the lubricant or grease in an amount varying between 3 and 40%, and preferably 8 to 40%, based upon the total weight of the lubricating grease. As stated, there may also be present in the grease non-lithium soaps of the character herein set forth. The grease may have incorporated therein a lithium soap of an unsaturated fatty acid, or a lithium soap of an unsaturated hydroxy fatty acid, or a lithium soap of unsaturated fatty acids of the ricinoleic series, said fatty acids having the general formula $C_nH_{2n-2}OH\ COOH$, or a lithium soap of 12-hydroxy stearic acid, or of hydrogenated ricinoleic acid, or of hydrogenated castor oil, or of the fatty acids of hydrogenated castor oil, and in addition there may also be present a non-lithium soap, as for example, a metal, metalloid soap, or a soap formed by saponifying an acid-containing material with an organic compound having basic properties typified by ethanolamines, or any other amine, amide, imide, or substitute ammonia product. More specifically, the non-lithium soap may be a calcium soap, a sodium soap, or an aluminum soap, or a mixture of any or all of said soaps. The non-lithium soap may be one which is formed by saponifying hydrogenated castor oil or the fatty acids of hydrogenated castor oil. More specifically, the non-lithium soap may be a soap of a 12-hydroxy stearic acid or of a poly-hydroxy stearic acid, or any of the soaps set forth in my copending application Serial No. 347,532, now Patent No. 2,308,599 granted January 19, 1943, and copending application Serial No. 449,014.

In accordance with the present invention, there also may be incorporated in the lubricating medium lithium soaps of the poly-hydroxy stearic acids. For example, the soaps may be formed by reacting the lithium containing compound with hydroxy stearic acids in which the hydroxy groups are in the 9 and 10 carbon positions.

It has been previously pointed out that greases containing a lithium soap made by reacting a lithium compound with a fatty acid of hydrogenated castor oil exhibit a much better inhibition against oxidation with phenylene diamine than when the grease is made with a lithium soap produced by reacting a lithium compound with the glyceride of hydrogenated castor oil. The phenylene diamine may be present in the grease in amounts varying between .01 to 2%. Generally, the amount of the phenylene diamine present in the grease should be under 1% and preferably vary from .01 to .1%. The grease or fluid lubricating medium having present a lithium soap of the character herein set forth may have present both dissolved phenylenediamine and dispersed phenylenediamine. Any of the phenylenediamines may be used, but it is preferable to use the meta compound instead of the ortho or the para compound.

It is desired to point out that it is highly advantageous to maintain the lubricating medium either neutral or slightly basic.

The Ubbelohde melting points herein set forth are all in degrees Fahrenheit.

Referring to Examples 1 to 7 inclusive, it is to be noted that in these examples the total soap content of the grease varies from 11.5% to 15%. However, the soap content can vary from 3% to 40% or even greater, and in some cases from 8% to 40% or even greater. In all of these greases the lithium soap or a plurality of lithium soaps of the character herein set forth are present in a predominating proportion and the non-lithium grease is present in a minor proportion. For example, the total soap content of the grease may be 75% lithium soap and 25% aluminum soap, which is a ratio of 3:1. However, the ratio of these soaps may be 2:1 or even 1:1. While preferably the lithium soap is present in a predominating proportion, in some cases the non-lithium soaps may predominate and the lithium soap or a mixture of lithium soaps of the character herein set forth may be present in a minor proportion. It is not desired to be limited to any specific ratio of the lithium soap to the non-lithium soap present in the grease, as this may vary between wide limits, in accordance with good grease practice.

What is claimed is:

1. A lubricating grease containing a grease-forming lubricant base and a lithium soap of 12-hydroxy stearic acid in a quantity which increases the ability of the grease to maintain its consistency when mechanically worked.

2. A lubricating grease containing a grease-forming lubricant base and a lithium soap of hydrogenated ricinoleic acid in a quantity which increases the ability of the grease to maintain its consistency when mechanically worked.

3. A lubricating grease containing a grease-forming lubricant base and a lithium soap of hydrogenated castor oil fatty acids in a quantity which increases the ability of the grease to maintain its consistency when mechanically worked.

4. A lubricating grease containing a grease-forming lubricant base and 3% to 40% of a lithium soap of 12-hydroxy stearic acid, which increases the ability of the grease to maintain its consistency when mechanically worked.

5. A lubricating grease containing a grease-forming lubricant base and a lithium soap of a mixture of hydrogenated castor oil and hydrogenated castor oil fatty acids in a quantity which increases the ability of the grease to maintain its consistency when mechanically worked.

6. A lubricating grease containing a grease-forming lubricant base, a soap of a higher saturated fatty acid, and a lithium soap of a 12-hydroxy stearic acid in a quantity which increases the ability of the grease to maintain its consistency when mechanically worked.

7. A lubricating grease containing a grease-forming lubricant base, a sodium soap, and a lithium soap of 12-hydroxy stearic acid in a quantity which increases the ability of the grease to maintain its consistency when mechanically worked.

8. A lubricating grease containing a grease-forming lubricant base and a plurality of soaps, one of said soaps being a lithium soap of a 12-hydroxy stearic acid present in a predominating proportion and in an amount which increases the ability of the grease to maintain its consistency when mechanically worked.

9. A lubricating grease containing a grease-forming lubricant base, a calcium soap, and a lithium soap of 12-hydroxy stearic acid in an amount which increases the ability of the grease to maintain its consistency when mechanically worked.

10. The method of producing a grease containing a lubricant base and a lithium soap of a 12-hydroxy stearic acid comprising imparting firmness and mechanical stability to the grease and resistance to seepage of the lubricant base therefrom by in situ forming the lithium soap in the lubricant base while the reaction mix is fluid, and agitating the reaction mix while the latter is cooling through a temperature range varying from about 425° F. to about 200° F. from the fluid state to the solid state.

11. The method of producing a grease containing a lubricant base and a lithium soap of a 12-hydroxy stearic acid comprising imparting firmness and mechanical stability to the grease and resistance to seepage of the lubricant base therefrom by in situ forming the lithium soap in the lubricant base while the reaction mix is fluid and heated to a temperature sufficiently to dehydrate the reaction mix, and agitating the dehydrated reaction mix while the latter is cooling through a temperature range varying from about 425° F. to about 200° F. from the fluid state to the solid state.

12. A glycerine-free lubricating grease inhibited against oxidation containing a lithium soap of 12-hydroxy stearic acid, together with less than about 1% of a phenylene diamine, the latter stabilizing the grease against oxidation, said lithium soap being present in an amount which increases the ability of the grease to maintain its consistency when mechanically worked.

13. A glycerine-free lubricating grease inhibited against oxidation containing a lithium soap of a fatty acid of hydrogenated castor oil together with less than 1% of a phenylene diamine, the latter stabilizing the grease against oxidation, said lithium soap being present in an amount which increases the ability of the grease to maintain its consistency when mechanically worked.

14. A glycerine-free lubricating grease inhibited against oxidation containing a lithium soap of a fatty acid of hydrogenated castor oil together with less than 1% of a phenylene diamine, the latter stabilizing the grease against oxidation, said grease being maintained in a state varying from neutrality to slightly basic, said lithium soap being present in an amount which increases the ability of the grease to maintain its consistency when mechanically worked.

15. A glycerine-free lubricating grease inhibited against oxidation containing a lithium soap of 12-hydroxy stearic acid together with less than 1% of a phenylene diamine, the latter stabilizing the grease against oxidation, said grease being maintained in a state varying from neutrality to slightly basic, said lithium soap being present in an amount which increases the ability of the grease to maintain its consistency when mechanically worked.

HAROLD M. FRASER.